United States Patent
Kitahara et al.

(10) Patent No.: US 8,053,051 B2
(45) Date of Patent: Nov. 8, 2011

(54) OXYGEN-ABSORBING BARRIER RESIN COMPOSITION, FILM COMPRISING THE SAME, MULTILAYER STRUCTURE, AND PACKING CONTAINER

(75) Inventors: Shizuo Kitahara, Tokyo (JP); Mako Kurakata, Tokyo (JP); Jun Ishihara, Tokyo (JP)

(73) Assignee: Zeon Corporation, Tokyo (JP)

( * ) Notice: Subject to any disclaimer, the term of this patent is extended or adjusted under 35 U.S.C. 154(b) by 639 days.

(21) Appl. No.: 12/084,127

(22) PCT Filed: Oct. 27, 2006

(86) PCT No.: PCT/JP2006/321493
§ 371 (c)(1), (2), (4) Date: Apr. 25, 2008

(87) PCT Pub. No.: WO2007/049740
PCT Pub. Date: May 3, 2007

(65) Prior Publication Data
US 2009/0263602 A1    Oct. 22, 2009

(30) Foreign Application Priority Data
Oct. 28, 2005 (JP) .................................. 2005-314232

(51) Int. Cl.
*B29D 22/00* (2006.01)
*B32B 5/16* (2006.01)
*B32B 27/08* (2006.01)

(52) U.S. Cl. ...... 428/36.6; 428/36.7; 428/327; 428/517; 428/520

(58) Field of Classification Search .......... 428/36.6, 428/327, 36.7, 517, 520
See application file for complete search history.

(56) References Cited

U.S. PATENT DOCUMENTS

| | | | | |
|---|---|---|---|---|
| 6,045,902 A | * | 4/2000 | Imanishi et al. | 428/327 |
| 6,759,107 B1 | * | 7/2004 | Tai et al. | 428/36.4 |
| 2005/0080199 A1 | | 4/2005 | Kitahara | |

FOREIGN PATENT DOCUMENTS

| | | |
|---|---|---|
| EP | 980892 A1 * | 2/2000 |
| EP | 1 460 104 A1 | 9/2004 |
| EP | 1 489 108 A1 | 12/2004 |
| EP | 1 589 037 A1 | 10/2005 |
| WO | WO-03/046072 A1 | 6/2003 |

(Continued)

*Primary Examiner* — Rena Dye
*Assistant Examiner* — James Yager
(74) *Attorney, Agent, or Firm* — Birch, Stewart, Kolasch & Birch, LLP

(57) ABSTRACT

To provide an oxygen-absorbing barrier resin composition which has excellent oxygen-barrier properties even under high-humidity conditions and can give a multilayer structure having excellent peel strength; an oxygen-absorbing barrier film comprising the oxygen-absorbing barrier resin composition; a multilayer structure including a layer comprising the oxygen-absorbing barrier film; and a packing container comprising the multilayer structure. The oxygen-absorbing barrier resin composition comprises a resin (A) having an oxygen permeability of at most 100 cc/m$^2$-day-atm and a resin (B) having an oxygen absorption rate of at least 0.001 cc/cm$^2$·day, wherein the resin (B) is dispersed in the matrix of the resin (A) and the resin (B) is in the form of rods in which the average of the maximum diameters of cross sections perpendicular to the lengthwise direction is at most 1.0 μm. The resin (B) preferably is a product of cyclization of a conjugated diene polymer, the cyclization product having an unsaturated bond reduction ratio of at least 10%.

6 Claims, 3 Drawing Sheets

FOREIGN PATENT DOCUMENTS

| WO | WO-2004/063230 A1 | 7/2004 |
| WO | WO-2005/053837 A1 | 6/2005 |
| WO | WO-2005/092940 A1 | 10/2005 |
| WO | WO-2006/101020 A1 | 9/2006 |
| WO | WO-2006/101021 A1 | 9/2006 |

* cited by examiner

OXYGEN-ABSORBING BARRIER RESIN COMPOSITION, FILM COMPRISING THE SAME, MULTILAYER STRUCTURE, AND PACKING CONTAINER

TECHNICAL FIELD

The present invention relates to an oxygen-absorbing barrier resin composition, an oxygen-absorbing barrier film comprising the oxygen-absorbing barrier resin composition, an oxygen-barrier multilayer structure having at least a layer comprising the oxygen-absorbing barrier film, and a packing container comprising the oxygen-barrier multilayer structure. More precisely, the invention relates to an oxygen-absorbing barrier resin composition that exhibits excellent oxygen-barrier properties especially under high-humidity conditions and can give a film having excellent peel strength; an oxygen-absorbing barrier film comprising the oxygen-absorbing barrier resin composition; an oxygen-barrier multilayer structure having at least a layer comprising the oxygen-absorbing barrier film; and a packing container comprising the oxygen-barrier multilayer structure.

BACKGROUND ART

The quality of foods, drinks, drugs and the like is deteriorated by oxygen, and therefore they are desired to be stored in the absence of oxygen or under the condition with an extremely small amount of oxygen.

Accordingly, for containers or packs for storing foods, drinks, drugs and the like, glass bottles and metal cans have been used. These containers do not let oxygen permeate therethrough, but are problematic in their distribution since they are readily broken or deformed and they are heavy. Accordingly, recently, various plastic containers that are lightweight and are relatively excellent in the impact resistance have become much used. However, plastic containers have a serious problem in that, since oxygen may readily permeate through the container wall, the contents therein are deteriorated by oxygen.

Against the problem, recently, resinous containers or packing materials are made to have oxygen absorbability by themselves, while, on the other hand, gas-barrier resins are tentatively used for those that constitute containers or packing materials.

For example, Patent Reference 1 discloses a film that comprises a matrix of a thermoplastic resin such as polyester resin and, dispersed as layers in the matrix, an aromatic polyamide resin.

Patent Reference 2 discloses a packing container having an oxygen-absorbing layer that comprises a substrate resin component such as a thermoplastic polyester resin to form a continuous layer, and an oxygen-absorbing functional component that comprises a polyamide resin, an oxidizing organic component and a transition metal catalyst to form a discontinuous layer.

These packing containers could exhibit gas-barrier properties on a certain level at high temperatures owing to the water resistance of the polyester resin therein, but since the continuous layer is composed of a polyester resin which has basically no gas-barrier properties, the gas-barrier properties of the containers could not be said sufficient.

On the other hand, an oxygen gas-barrier resin composition is known, which comprises a saponified product of an ethylene/vinyl acetate copolymer serving as a gas-barrier resin and contains an oxidation catalyst such as cobalt stearate added thereto (Patent References 3 and 4).

Polyvinyl alcohol polymers such as a saponified product of an ethylene/vinyl acetate copolymer, a polyvinyl alcohol and the like are thermoplastic, to which, therefore, various shaping methods are applicable. Accordingly, they are useful as a packing container material; however, their water vapor permeability is high and their oxygen permeability greatly varies depending on humidity. Therefore, they are problematic in that their oxygen gas-barrier properties are poor especially in high-humidity environments. Films obtained by laminating such a polyvinyl alcohol polymer and a polypropylene film or the like have a problem in that the peel strength between them is low.

Patent Reference 1: JP-A 2001-164002
Patent Reference 2: JP-A 2005-112468 (WO2005/016782)
Patent Reference 3: JP-A 4-211444 (U.S. Pat. No. 5,164,438)
Patent Reference 4: JP-A 5-170980 (EP-A 0546546)

DISCLOSURE OF THE INVENTION

Problems that the Invention is to Solve

Accordingly, an object of the present invention is to provide an oxygen-absorbing barrier resin composition that can give a multilayer structure having excellent oxygen-barrier properties not only in low-humidity environments but also under high-humidity conditions and excellent peel strength.

Another object of the invention is to provide an oxygen-absorbing barrier film that comprises the oxygen-absorbing barrier resin composition.

Still another object of the invention is to provide an oxygen-barrier multilayer structure having at least a layer that comprises the oxygen-absorbing barrier film, and a packing container that comprises the oxygen-barrier multilayer structure.

Means for Solving the Problems

The present inventors have assiduously studied for the purpose of solving the above-mentioned problems and have found that a resin composition, prepared by dispersing a resin having a specific oxygen absorption rate with a specific structure in a matrix resin having a specific oxygen permeability, satisfies the above-mentioned objects; and on the basis of this finding, the inventors have completed the present invention.

According to the invention, therefore, there is provided an oxygen-absorbing barrier resin composition that comprises a resin (A) having an oxygen permeability of at most 100 cc/m$^2$·day·atm (20 μm) and a resin (B) having an oxygen absorption rate of at least 0.001 cc/cm$^2$·day (20 μm), wherein the resin (B) is dispersed in the matrix of the resin (A) and the resin (B) is in the form of rods of such that the average maximum diameter of the cross section thereof perpendicular to the lengthwise direction is at most 1.0 μm.

In the oxygen-absorbing barrier resin composition of the invention, the proportion of those of the resin (B) of which the maximum diameter of the cross section perpendicular to the lengthwise direction is at most 1.0 μm is preferably at least 70%.

In the oxygen-absorbing barrier resin composition of the invention, the ratio of the length in the lengthwise direction to the maximum diameter of the cross section (the length in the lengthwise direction/the maximum diameter of the cross section) of the resin (B) in the matrix of the resin (A) is preferably more than 5.

In the oxygen-absorbing barrier resin composition of the invention, the oxygen permeability of the resin (A) is preferably at most 20 cc/m$^2$·day·atm (20 μm).

In the oxygen-absorbing barrier resin composition of the invention, the blend ratio of the resin (A) to the resin (B), the ratio by weight of resin (A)/resin (B), is preferably from 95/5 to 50/50.

In the oxygen-absorbing barrier resin composition of the invention, the resin (A) is preferably a polyamide resin or a polyvinyl alcohol polymer.

In the oxygen-absorbing barrier resin composition of the invention, the polyvinyl alcohol is preferably an ethylene/vinyl alcohol copolymer.

In the oxygen-absorbing barrier resin composition of the invention, the ethylene/vinyl alcohol copolymer preferably has an ethylene content of at least 15 mol %.

In the oxygen-absorbing barrier resin composition of the invention, the resin (B) is preferably a cyclized product of a conjugated diene polymer having an unsaturated bond reduction ratio of at least 10%.

In the oxygen-absorbing barrier resin composition of the invention, the resin (B) is preferably a mixture of a cyclized product of a conjugated diene polymer and a poly-α-olefin resin.

In the oxygen-absorbing barrier resin composition of the invention, the amount of the poly-α-olefin resin in the mixture of a cyclized product of a conjugated diene polymer and a poly-α-olefin resin is preferably at most 90% by weight relative to 100 parts by weight of the total of the cyclized product of a conjugated diene polymer and the poly-α-olefin resin.

The oxygen-absorbing resin composition of the invention is preferably in the form of pellets.

According to the invention, there is also provided an oxygen-absorbing barrier film that comprises a resin (A) having an oxygen permeability of at most 100 cc/m$^2$·day·atm (20 μm) and a resin (B) having an oxygen absorption rate of at least 0.001 cc/cm$^2$·day (20 μm), wherein the resin (B) is dispersed in the matrix of the resin (A) and the resin (B) is in the form of rods of such that the average maximum diameter of the cross section thereof perpendicular to the lengthwise direction is at most 1.0 μm.

The oxygen-absorbing barrier film of the invention may be obtained by shaping the oxygen-absorbing barrier resin composition of the invention.

In the oxygen-absorbing barrier film of the invention, the proportion of those of the resin (B) of which the maximum diameter of the cross section perpendicular to the lengthwise direction is at most 1.0 μm, is preferably at least 70%.

In the oxygen-absorbing barrier film of the invention, the ratio of the length in the lengthwise direction to the maximum diameter of the cross section (the length in the lengthwise direction/the maximum diameter of the cross section) of the resin (B) in the matrix of the resin (A) is preferably more than 5.

Preferably, the oxygen-absorbing barrier film of the invention has a three-layered structure of surface layer (1)/core layer/surface layer (2), in which the proportions of the thickness of respective layers to the overall thickness of the three layers are from 15 to 40% for the surface layer (1), from 20 to 70% for the core layer and from 15 to 40% for the surface layer (2).

In the oxygen-absorbing barrier film having a three-layered structure, the ratio of the major diameter to the minor diameter in the cross section perpendicular to the lengthwise direction of the resin (B) is less than 2.0 in the surface layer (1) and the surface layer (2), and is at least 2.0 in the core layer.

Further according to the invention, there is provided an oxygen-barrier multilayer structure that has at least a layer comprising the oxygen-absorbing barrier film.

Further according to the invention, there is provided a packing container comprising the oxygen-barrier multilayer structure.

Advantages of the Invention

The oxygen-absorbing gas-barrier resin composition of the invention has excellent oxygen-barrier properties not only in low-humidity atmospheres but also in high-humidity atmospheres, and the multilayer structure obtained from it has excellent peel strength. The oxygen-absorbing barrier film and the multilayer structure of the invention that are obtained by the use of the oxygen-absorbing barrier resin composition have excellent oxygen gas barrier properties, and the multilayer structure has excellent peel strength; and therefore these are favorable for packing materials for various foods, chemicals, drugs, cosmetics, etc.

BEST MODES FOR CARRYING OUT THE INVENTION

Figure 1:
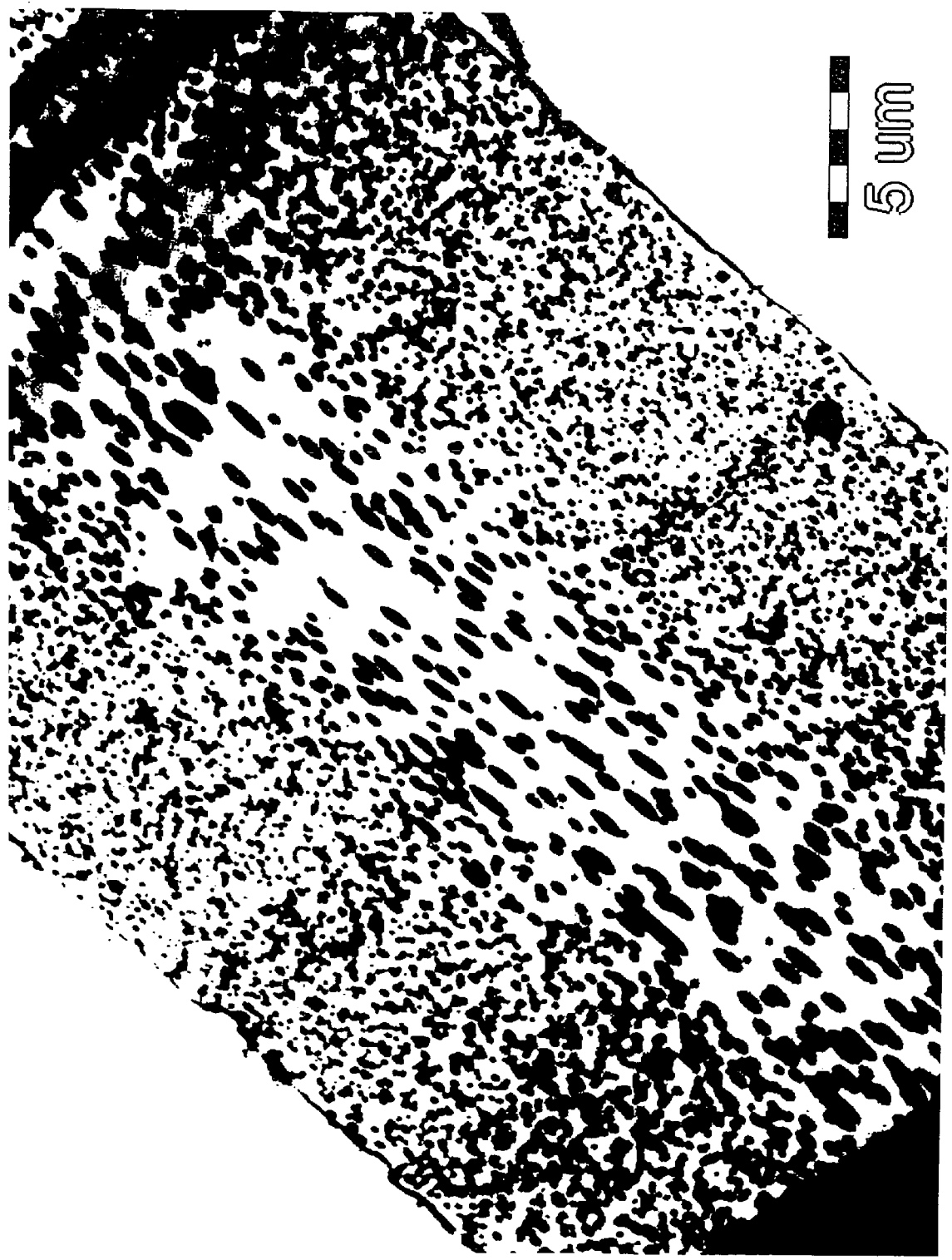
FIG. 1 This is an electromicroscopic photograph of a TD-cross section of an oxygen-absorbing barrier film of the invention, showing the dispersion condition of a resin (B) blend in the film. In the figure, the length of the line segment is 5 μm.

The oxygen-absorbing gas-barrier resin composition of the invention comprises a matrix of a resin (A) having, as its film having a thickness of 20 μm, an oxygen permeability of at most 100 cc/m$^2$·day·atm in an environment at 25° C. and a relative humidity of 65% [in the invention, this is expressed as "at most 100 cc/m$^2$·day·atm (20 μm)"—in case where the environmental condition is changed, this is additionally described] and, dispersed in the matrix, a resin (B) having an oxygen absorption rate of at least 0.001 cc/cm$^2$·day at 25° C. [in the invention, this is expressed as "at least 0.001 cc/cm$^2$·day (20 μm)"].

In the oxygen-absorbing resin composition of the invention, the blend ratio of the resin (A) to the resin (B), the ratio by weight of resin (A)/resin (B), is preferably from 95/5 to 50/50, more preferably from 90/10 to 50/50. The blend ratio of the resin (A) to the resin (B) falling within the above-mentioned range may give an oxygen-absorbing barrier resin composition having especially excellent oxygen barrier properties under high-humidity conditions and having great peel strength.

Specific examples of the resin (A) having an oxygen permeability of at most 100 cc/m$^2$·day·atm (20 μm) in environments at 25° C. and a relative humidity of 65% include a polyamide resin and a polyvinyl alcohol polymer. The oxygen permeability of the resin is preferably at most 20 cc/m$^2$·day·atm (20 μm) under the same condition.

The polyamide resin is not specifically limited but is preferably (a) an aliphatic, alicyclic or semi-aromatic polyamide derived from a dicarboxylic acid component and a diamine component, (b) a polyamide derived from an aminocarboxylic acid or its lactam, or (c) their copolyamide or blend.

The dicarboxylic acid component to synthesize the polyamide resin includes, for example, an aliphatic dicarboxylic acid having from 4 to 15 carbon atoms, such as succinic acid, adipic acid, sebacic acid, decanedicarboxylic acid, undecanedicarboxylic acid and dodecanedicarboxylic acid; and an aromatic dicarboxylic acid such as terephthalic acid and isophthalic acid.

The diamine component includes a straight-chain or branched-chain alkylenediamine having from 4 to 25 carbon atoms, preferably from 6 to 18 carbon atoms, such as 1,6-diaminohexane, 1,8-diaminooctane, 1,10-diaminodecane and 1,12-diaminododecane; an alicyclic diamine such as bis(aminomethyl)cyclohexane, bis(4-aminocyclohexyl)methane and 4,4'-diamino-3,3'-dimethyldicyclohexylmethane, preferably bis(4-aminocyclohexyl)methane, 1,3-bis(aminocyclohexyl)methane and 1,3-bis(aminomethyl)cyclohexane; and an aromatic diamine such as m-xylylenediamine and/or p-xylylenediamine.

The aminocarboxylic acid component includes an aliphatic aminocarboxylic acid such as α,β, ω-aminocaproic acid, ω-aminooctanoic acid, ω-aminoundecanoic acid and ω-aminododecanoic acid; an aromatic aminocarboxylic acid such as p-aminomethylbenzoic acid and p-aminophenylacetic acid; etc.

For the object of the invention, preferred is a xylylene group-having polyamide of those polyamide resins, concretely including a homopolymer such as poly-m-xylyleneadipamide, poly-m-xylylenesebacamide, poly-m-xylylenesuberamide, poly-p-xylylenepimeramide and poly-m-xylyleneazelamide; a copolymer such as m-xylylene/p-xylyleneadipamide copolymer, m-xylylene/p-xylylenepimeramide copolymer, m-xylylene/p-xylylenesebacamide copolymer and m-xylylene/p-xylyleneazelamide copolymer; and a copolymer prepared by copolymerizing a component of such a homopolymer or copolymer and an aliphatic diamine such as hexamethylenediamine, an alicyclic diamine such as piperazine, an aromatic diamine such as p-bis(2-aminoethyl)benzene, an aromatic dicarboxylic acid such as terephthalic acid, a lactam such as ε-caprolactam, an ω-aminocarboxylic acid such as 7-aminoheptanoic acid, an aromatic aminocarboxylic acid such as p-aminomethylbenzoic acid or the like.

Of those, preferred for use herein are polyamides obtained from a diamine component mainly comprising m-xylylenediamine and/or p-xylylenediamine, and a dicarboxylic acid component comprising an aliphatic dicarboxylic acid and/or an aromatic dicarboxylic acid.

Preferably, the molecular weight of the polyamide resin is such that the relative viscosity thereof measured as its solution in concentrated sulfuric acid having a concentration of 1.0 g/dl, at 30° C. is at least 1.1, more preferably at least 1.5. The polyamide resin, having a molecular weight falling within the range, has excellent film formability, and is therefore favorable for forming an oxygen-absorbing barrier resin film.

The polyvinyl alcohol polymer is a polymer or a copolymer having vinyl alcohol as its constitutive unit. The copolymer includes an α-olefin/vinyl alcohol copolymer such as an ethylene/vinyl alcohol copolymer. In the invention, preferably used is an ethylene/vinyl alcohol copolymer.

The ethylene/vinyl alcohol copolymer is, from the viewpoint of its structure, a copolymer that comprises ethylene and vinyl alcohol as the main constitutive units thereof; but it may be actually obtained by saponifying a copolymer of ethylene and a vinyl ester of a fatty acid, with an alkali catalyst or the like.

The vinyl ester of a fatty acid to be copolymerized with ethylene is typically vinyl acetate, and in addition to it, also usable are vinyl propionate, vinyl pivalate, etc. The ethylene/vinyl alcohol copolymer for use in the invention is not specifically limited to those produced by a method of saponification.

In the ethylene/vinyl alcohol copolymer for use in the invention, the ethylene content is preferably at least 15 mol %, more preferably at least 25 mol %, even more preferably from 30 to 45 mol %. The ethylene content may be determined according to the nuclear magnetic resonance (NMR) spectroscopy.

The copolymer having an ethylene content falling within the above range is well compatible with the resin (B) that serves as an oxygen-absorbing component, and the resin composition to be obtained may have excellent oxygen barrier properties.

One or more different types of ethylene-vinyl alcohol copolymers may be used either singly or as combined.

In the ethylene/vinyl alcohol copolymer mixture of two or more copolymers having a different ethylene content, the ethylene content may be determined from the blend ratio by weight of the copolymers combined.

The degree of saponification of the vinyl ester segment in the ethylene/vinyl alcohol copolymer (the ratio of the vinyl alcohol structure-having monomer unit segment to the total of the vinyl alcohol structure-having monomer unit segment and the vinyl ester structure-having monomer unit segment) is preferably at least 90 mol %, more preferably at least 95 mol %, even more preferably at least 97 mol %.

The degree of saponification may be determined according to the nuclear magnetic resonance (NMR) spectroscopy.

When the degree of saponification of the ethylene/vinyl alcohol copolymer falls within the above-mentioned range, then the resin composition of the invention obtained by using the copolymer may have excellent gas barrier properties. In addition, the ethylene/vinyl alcohol copolymer of the type has good thermal stability, and the shaped articles of the resin composition obtained by using the copolymer do not have impurities such as gels and fish eyes.

In case where two or more copolymers having a different degree of saponification are combined, the degree of saponification of the ethylene/vinyl alcohol copolymer mixture may be determined from the blend ratio by weight of the copolymers combined.

The resin (B) for use in the invention has, as its film having a thickness of 20 μm, an oxygen absorption rate of at least 0.001 cc/cm²·day (20 μm), as measured under a condition of 25° C.

A preferred example of the resin (B) for use in the invention is a cyclized product having an unsaturated bond reduction ratio of at least 10% of a conjugated diene polymer. The unsaturated bond reduction ratio preferably falls within a range of from 30% to 65%, more preferably from 45 to 60%. The use of the cyclized product of a conjugated diene polymer having an unsaturated bond reduction ratio of at least 10% allows excellent oxygen barrier properties of the oxygen-absorbing barrier resin composition of the invention.

The cyclized product of a conjugated diene polymer is obtained through cyclization of a conjugated diene polymer in the presence of an acid catalyst.

The conjugated diene polymer for use herein includes a homopolymer and a copolymer of conjugated diene monomer(s), and a copolymer of a conjugated diene monomer and a monomer copolymerizable with it.

The conjugated diene monomer is not particularly limited, and examples thereof include 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene, 3-butyl-1,3-octadiene, etc.

One or more of these monomers may be used either singly or as combined.

The other monomer copolymerizable with the conjugated diene monomer includes, for example, aromatic vinyl monomers such as styrene, o-methylstyrene, p-methylstyrene, m-methylstyrene, 2,4-dimethylstyrene, ethylstyrene, p-t-butylstyrene, α-methylstyrene, α-methyl-p-methylstyrene, p-chlorostyrene, m-chlorostyrene, p-chlorostyrene, p-bromostyrene, 2,4-dibromostyrene and vinylnaphthalene; chain olefin monomers such as ethylene, propylene and 1-butene; cyclic olefin monomers such as cyclopentene and 2-norbornene; non-conjugated diene monomers such as 1,5-hexadiene, 1,6-heptadiene, 1,7-octadiene, dicyclopentadiene and 5-ethylidene-2-norbornene; (meth)acrylates such as methyl (meth)acrylate and ethyl (meth)acrylate; other (meth)acrylic acid derivatives such as (meth)acrylonitrile and (meth)acrylamide; etc.

One or more of these monomers may be used either singly or as combined.

Specific examples of the conjugated diene polymer include homo- or copolymers of conjugated diene(s) such as natural rubber (NR), polyisoprene rubber (IR), polybutadiene rubber (BR) and butadiene/isoprene copolymer rubber (BIR); and copolymers of a conjugated diene and a monomer copolymerizable with it, for example, aromatic vinyl/conjugated diene block copolymers such as styrene/butadiene rubber (SBR), isoprene/isobutylene copolymer rubber (IIR), ethylene/propylene/diene copolymer rubber (EPDM) and styrene/isoprene block copolymer; etc. Above all, preferred are polyisoprene rubber, polybutadiene rubber and styrene/isoprene block copolymer; and more preferred are polyisoprene rubber and styrene/isoprene block copolymer.

In the copolymer of a conjugated diene and a monomer copolymerizable with it, the content of the conjugated diene monomer unit may be suitably selected within a range not detracting from the advantages of the invention, but in general, it may be at least 40 mol %, preferably at least 60 mol %, more preferably at least 80 mol %. Above all, polymers substantially comprising a conjugated diene monomer unit are preferred. When the content of the conjugated diene monomer unit is too small, then the unsaturated bond reduction ratio falling within a suitable range may be difficult to obtain.

In case where the cyclized product of a conjugated diene polymer is a cyclized product of an aromatic vinyl/conjugated diene block copolymer, the aromatic vinyl monomer unit content in the cyclized product is not specifically defined, but is generally from 1 to 90% by weight, preferably from 5 to 50% by weight, more preferably from 10 to 30% by weight. When the content is too small, then the initial mechanical strength of the oxygen-absorbing barrier resin composition may lower, and the reduction in the mechanical strength thereof after oxygen absorption may be large. On the contrary, when the aromatic vinyl monomer unit content is too large, then the proportion of the block of the cyclized product of a conjugated diene polymer may relatively lower whereby the oxygen barrier properties of the composition may worsen.

The conjugated diene polymer may be prepared in an ordinary polymerization method, and for example, it may be prepared through solution polymerization or emulsion polymerization using a suitable catalyst such as a Ziegler polymerization catalyst containing titanium or the like as the catalyst component, or an alkyllithium polymerization catalyst or a radical polymerization catalyst.

The cyclized product of a conjugated diene polymer to be used in the invention may be prepared through cyclization of the above-mentioned conjugated diene polymer in the presence of an acid catalyst.

The acid catalyst for use in the cyclization may be any known one. Its specific examples include sulfuric acid; organic sulfonic acid compounds such as fluoromethanesulfonic acid, difluoromethanesulfonic acid, p-toluenesulfonic acid, xylenesulfonic acid, alkylbenzenesulfonic acids having an alkyl group with from 2 to 18 carbon atoms, and their anhydrides and alkyl esters; Lewis acids such as boron trifluoride, boron trichloride, tin tetrachloride, titanium tetrachloride, aluminum chloride, diethylaluminum monochloride, ethylammonium dichloride, aluminum bromide, antimony pentachloride, tungsten hexachloride and iron chloride; etc. One or more of these acid catalysts may be used either singly or as combined. Above all, preferred are organic sulfonic acid compounds; and more preferred are p-toluenesulfonic acid and xylenesulfonic acid.

The amount of the acid catalyst to be used may be generally from 0.05 to 10 parts by weight per 100 parts by weight of the conjugated diene polymer, preferably from 0.1 to 5 parts by weight, more preferably from 0.3 to 2 parts by weight.

In general, the conjugated diene polymer is dissolved in a hydrocarbon solvent for its cyclization.

The hydrocarbon solvent is not particularly limited, and may be any one not interfering with the cyclization, including, for example, aromatic hydrocarbons such as benzene, toluene, xylene and ethylbenzene; aliphatic hydrocarbons such as n-pentane, n-hexane, n-heptane and n-octane; alicyclic hydrocarbons such as cyclopentane and cyclohexane; etc. Preferably, the boiling point of those hydrocarbon solvents is not lower than 70° C.

The solvent for the polymerization to give the conjugated diene polymer and the solvent for the cyclization may be the same type. In this case, an acid catalyst for cyclization may be added to the polymerization reaction liquid after polymerization, whereby the cyclization may be attained after the polymerization.

The amount of the hydrocarbon solvent to be used may be such that the solid concentration of the conjugated diene polymer therein could be generally from 5 to 60% by weight, preferably from 20 to 40% by weight.

The cyclization may be attained under pressure or under reduced pressure, or under atmospheric pressure, but from the viewpoint of the simplicity in operation, it is preferably under atmospheric pressure. The cyclization in a dry stream, especially in an atmosphere of dry nitrogen or dry argon may prevent side reactions to be caused by moisture.

The reaction temperature and the reaction time in the cyclization are not specifically defined. The reaction temperature may be generally from 50 to 150° C., preferably from 70 to 110° C.; and the reaction time may be generally from 0.5 to 10 hours, preferably from 2 to 5 hours.

After the cyclization, the acid catalyst is inactivated in an ordinary manner, then the acid catalyst residue is removed, and thereafter the hydrocarbon solvent is removed, thereby giving a solid cyclized product of a conjugated diene polymer.

The unsaturated bond reduction ratio of the cyclized product of a conjugated diene polymer is an index that indicates the degree of unsaturated bond reduction through cyclization in the conjugated diene monomer unit segment in the conjugated diene polymer; and its value is determined in the manner mentioned below. Specifically, in the conjugated diene monomer unit segment in a conjugated diene polymer, the ratio of the peak area of the protons directly bonding to the double bond to the peak area of all protons is determined through proton NMR analysis before and after cyclization, and the reduction ratio is computed from the data.

In the conjugated diene monomer unit segment in a conjugated diene polymer, when the overall proton peak area before cyclization is represented by SBT and the peak area of the protons directly bonding to the double bond before cyclization is by SBU, and the overall proton peak area after cyclization is represented by SAT and the peak area of the protons directly bonding to the double bond after cyclization is by SAU, then the peak area ratio (SB) of the protons directly bonding to the double bond before cyclization is:

$$SB=SBU/SBT,$$

and the peak area ratio (SA) of the protons directly bonding to the double bond after cyclization is:

$$SA=SAU/SAT.$$

Accordingly, the unsaturated bond reduction ratio is determined according to the following expression:

$$\text{Unsaturated bond reduction ratio (\%)}=100\times(SB-SA)/SB.$$

The unsaturated bond reduction ratio of the cyclized product of a conjugated diene polymer may be controlled by suitably selecting the amount of the acid catalyst, the reaction temperature, the reaction time and others in cyclization.

For obtaining a cyclized product of a conjugated diene polymer having a desired unsaturated bond reduction ratio, for example, employable is a method of previously preparing the calibration curves of the amount of the acid catalyst, the reaction temperature, the reaction time and others in cyclization, and attaining the cyclization on the basis of these.

The weight-average molecular weight of the cyclized product of a conjugated diene polymer for use in the invention is preferably from 10,000 to 1,000,000, in terms of standard polystyrene measured through gel permeation chromatography, more preferably from 20,000 to 700,000, even more preferably from 30,000 to 500,000.

In case where the cyclized product of a conjugated diene polymer is a cyclized product of an aromatic vinyl/conjugated diene block copolymer, the weight-average molecular weight of the aromatic vinyl polymer block is preferably from 1,000 to 500,000, more preferably from 3,000 to 300,000, even more preferably from 5,000 to 100,000, still more preferably from 8,000 to 50,000. When the weight-average molecular weight is too low, then the initial mechanical strength of the oxygen-absorbing barrier resin composition may lower, and the reduction in the mechanical strength thereof after oxygen absorption may increase. On the contrary, when the weight-average molecular weight is too high, then the proportion of the block of the cyclized product of a conjugated diene polymer may lower relatively, and the oxygen barrier properties of the composition may worsen.

The weight-average molecular weight of the cyclized product of a conjugated diene polymer may be controlled by suitably selecting the weight-average molecular weight of the conjugated diene polymer to be cyclized.

When the weight-average molecular weight of the cyclized product of a conjugated diene polymer is too low, then the composition may be difficult to form into a film, and its mechanical strength may lower. When the weight-average molecular weight of the cyclized product of a conjugated diene polymer is too high, then the solution viscosity in cyclization may increase and the composition may be difficult to handle, and the processability thereof in extrusion may worsen.

The gel (toluene-insoluble) fraction of the cyclized product of a conjugated diene polymer may be generally at most 10% by weight, preferably at most 5% by weight, but more preferably the cyclized product contains substantially no gel. When the gel fraction is too much, then the film formed of the resin composition may lose smoothness.

In the invention, for securing the thermal stability in processing the cyclized product of a conjugated diene polymer, an antioxidant may be added to the cyclized product of a conjugated diene polymer. The amount of the antioxidant is not particularly limited and may be generally within a range of from 10 to 5,000 ppm, relative to the weight of the cyclized product of a conjugated diene polymer, preferably from 30 to 3,000 ppm, more preferably from 50 to 2,000 ppm.

The amount of the antioxidant in the oxygen-absorbing barrier resin composition of the invention may be generally within a range of from 10 to 3,000 ppm, preferably from 30 to 2,000 ppm, more preferably from 50 to 1,000 ppm. However, when the amount of the antioxidant added is too much, then it may lower the oxygen absorbability of the resin (B) and may thereby worsen the oxygen barrier properties of the composition; and therefore, in consideration of the stability in processing the oxygen-absorbing barrier resin composition, the amount to be added will have to be suitably controlled.

The antioxidant is not particularly limited and may be any one generally used in the field of resin materials or rubber materials. Typical examples of the antioxidant include hindered phenolic antioxidants, phosphorus-containing antioxidants and lactone-based antioxidants. Two or more types of such antioxidants may be used as combined. In particular, preferred is a combination of a phenolic antioxidant and a phosphorus-containing antioxidant. In addition, an amine-based light stabilizer (HALS) may also be added.

Specific examples of the hindered phenolic antioxidants are 2,6-di-t-butyl-p-cresol, pentaerythritol tetrakis[3-(3,5-di-t-butyl-4-hydroxyphenyl)propionate], thiodiethylenebis[3-(3,5-di-t-butyl-4-hydroxyphenyl)propionate], octadecyl 3-(3,5-di-t-butyl-4-hydroxyphenyl)propionate, N,N'-hexane-1,6-diylbis[3-(3,5-di-t-butyl-4-hydroxyphenyl)propionamide], diethyl [[3,5-bis(1,1-dimethylethyl)-4-hydroxyphenyl]methyl]phosphonate, 3,3',3'',5,5',5''-hexa-t-butyl-a,a',a''-(mesitylene-2,4,6-triyl)tri-p-cresol, hexamethylenebis [3-(3,5-di-t-butyl)-4-hydroxyphenyl] propionate, tetrakis [methylene-3-(3,5-di-t-butyl-4-hydroxyphenyl)propionate] methane, n-octadecyl 3-(4'-hydroxy-3,5'-di-t-butylphenyl) propionate, 1,3,5-tris(3,5-di-t-butyl-4-hydroxybenzyl)-1,3,5-triazine-2,4,6 (1H,3H,5H)-trione, 2,4-bis(n-octylthio)-6-(4-hydroxy-3,5-di-t-butylanilino)-1,3,5-triazine, tris(3,5-di-t-butyl-4-hydroxybenzyl) isocyanurate, 2-t-butyl-6-(3'-t-butyl-2'-hydroxy-5'-methylbenzyl)-4-methylphenyl acrylate, 2-[1-(2-hydroxy-3,5-di-t-phenyl)ethyl]-4,6-di-t-pentylphenyl acrylate, etc.

The phosphorus-containing antioxidants include 2,2'-methylenebis(4,6-di-t-butylphenyl)octyl phosphite, tris(2,4-di-t-butylphenyl) phosphite, bis[2,4-bis(1,1-dimethylethyl)-6-methylphenyl]ethyl phosphite, tetrakis(2,4-di-t-butylphenyl) [1,1-biphenyl]-4,4'-diyl bisphosphonite, bis(2,4-di-t-butylphenyl)pentaerythritol phosphite, etc.

The lactone-based antioxidants include reaction products of 5,7-di-t-butyl-3-(3,4-dimethylphenyl)-3H-benzofuran-2-one or the like with o-xylene.

In addition, if desired, various compounds generally added to the cyclized product of a conjugated diene polymer may be added thereto. The compounds include a filler such as calcium carbonate, alumina and titanium oxide; a tackifier (hydrogenated petroleum resins, hydrogenated terpene resins, castor oil derivatives, sorbitan higher fatty acid esters, low-molecular polybutenes); a plasticizer (phthalates, glycol esters); a surfactant; a leveling agent; a UV absorbent; a light stabilizer; a dehydrating agent; a pot life extender (acetylacetone, methanol, methyl orthoacetate, etc.); a cissing-improving agent; etc.

In the invention, if desired, a poly-α-olefin resin may be combined with the cyclized product of a conjugated diene polymer. This may enhance the tensile strength of the oxygen-absorbing barrier resin composition.

The poly-α-olefin resin may be any of a homopolymer of α-olefin, a copolymer of two or more types of α-olefins, or a copolymer of an α-olefin and a monomer except α-olefin, and may also be a modified derivative from these (co)polymers.

Specific examples of the poly-α-olefin resin include a homopolymer or a copolymer of an α-olefin such as ethylene or propylene, for example, an α-olefin homopolymer such as polyethylene, e.g., linear low-density polyethylene (LLDPE), low-density polyethylene (LDPE), middle-density polyethylene (MDPE), high-density polyethylene (HDPE) and metallocene polyethylene, polypropylene, metallocene polypropylene, polymethylpentene and polybutene; a copolymer of ethylene with any other α-olefin, for example, ethylene/propylene random copolymer, ethylene/propylene block copolymer, ethylene/propylene/polybutene-1 copolymer and ethylene/cyclic olefin copolymer; copolymer of an α-olefin as a main component with an unsaturated alcohol carboxylate, and its saponified product, for example, ethylene/vinyl acetate copolymer and ethylene/vinyl alcohol copolymer; an copolymer of an α-olefin as a main component with an α, β-unsaturated carboxylate or an α,β-unsaturated carboxylic acid or the like, for example, ethylene/α,β-unsaturated carboxylate copolymer (ethylene/ethyl acrylate copolymer, ethylene/methyl methacrylate copolymer, etc.) and ethylene/α,β-unsaturated carboxylic acid copolymer (ethylene/acrylic acid copolymer, ethylene/methacrylic acid copolymer, etc.); an acid-modified poly-α-olefin resin prepared by modifying an α-olefin (co)polymer such as polyethylene or polypropylene, with an unsaturated carboxylic acid such as acrylic acid, methacrylic acid, maleic acid, maleic anhydride, fumaric acid or itaconic acid; an ionomer resin prepared by processing an ethylene/methacrylic acid copolymer or the like with Na ion or Zn ion; their mixtures; etc.

One or more such poly-α-olefin resins may be used either singly or as combined. The amount of the poly-α-olefin resin to be used is preferably from 0 to 90% by weight relative to 100 parts by weight of the total of the cyclized product of a conjugated diene polymer and the poly-α-olefin resin, more preferably from 10 to 80% by weight, even more preferably from 15 to 70% by weight, still more preferably from 20 to 60% by weight. Within the above-defined range, the oxygen-absorbing barrier resin composition may well keep the balance among the oxygen barrier properties and the mechanical strength thereof; and when the proportion of the cyclized product of a conjugated diene polymer therein is higher, then the composition may have better oxygen barrier properties.

In the oxygen-absorbing barrier resin composition of the invention, it is necessary that the resin (B) in the matrix of the resin (A) is in the form of rods of such that the average maximum diameter of the cross section thereof perpendicular to the lengthwise direction is at most 1.0 μm.

As the resin (B) is dispersed under the condition as above, the oxygen-absorbing barrier resin composition of the invention may have good oxygen barrier properties. This may be because the resin (B), as dispersed under the condition as above, may efficiently absorb the oxygen molecules having passed through the matrix of the resin (A), therefore enhancing the oxygen barrier properties of the entire oxygen-absorbing barrier resin composition.

The maximum diameter of the cross section of the resin (B) perpendicular to the lengthwise direction (this may be hereinafter simply referred to as "maximum diameter of cross section") may be at most 1 μm on average; but preferably the proportion of those, of which the maximum diameter of the cross section is at most 1.0 μm, is preferably at least 70%, more preferably at least 90%.

In the matrix of the resin (A), the ratio of the length in the lengthwise direction to the maximum diameter of the cross section (the length in the lengthwise direction/the maximum diameter of the cross section) of the resin (B) having a rod-shaped structure is preferably more than 5.

To the oxygen-absorbing barrier resin composition of the invention, optionally added are a heat-resistant stabilizer; a UV absorbent; an antioxidant; a colorant; a pigment; a neutralizing agent; a plasticizer such as phthalate or glycol ester; a filler; a surfactant; a leveling agent; a light stabilizer; a dehydrating agent such as alkaline earth metal oxide; a deodorant such as activated carbon or zeolite; a tackifier (castor oil derivatives, sorbitan higher fatty acid esters, low-molecular polybutenes); a pot life extender (acetylacetone, methanol, methyl orthoacetate, etc.); a cissing-improving agent; other resins (poly-α-olefins, etc.); etc.

If desired, an anti-blocking agent, an antifogging agent, a weather-resistant stabilizer, a lubricant, an antistatic agent, a reinforcing agent, a flame retardant, a coupling agent, a blowing agent, a mold releasing agent or the like may be added to the composition.

The oxygen-absorbing barrier resin composition of the invention is obtained by melt-kneading the resin (A) and the resin (B). In general, the resin (A) and the resin (B) are melt-kneaded with a kneading machine, and the obtained melt mixture is formed into strands through a die (generally having a diameter of 3 mmϕ), then these are led into water, and cut with a roll cutter or the like to give pellets of the composition.

For the melt-kneading, for example, usable are a continuous kneading machine such as continuous intensive mixer, single-screw extruder, unidirectional or multidirectional kneading-type double-screw extruder, mixing roll or co-kneader; a batch-type kneading machine such as high-speed mixer, Banbury mixer, intensive mixer or pressure kneader; a rotary disc-assisted device having a grinding mechanism such as stone mill, for example, KCK's KCK melt-kneading extruder; a single-screw extruder equipped with a kneading zone (Dalmage, CTM, etc.); a simple kneading machine such as ribbon blender or Brabender mixer; etc. Above all, preferred are a single-screw extruder and a double-screw extruder; and more preferred is a double-screw extruder. One or more kneading machines may be used either singly or as connected.

In these continuous kneading machines, the shapes of the rotor and the disc play an important role. In particular, the tip clearance between the mixing chamber and the rotor tip or the disc tip is important, and is most suitably from 1 to 5 mm. When the tip clearance is too narrow or too broad, a mixture of good dispersibility could not be obtained.

The number of revolution of the rotor of the kneading machine may be generally from 20 to 1,200 rpm, preferably from 30 to 800 rpm. The inner diameter (D) of the chamber of the kneading machine may be generally at least 20 mm, preferably from 30 to 400 mm. Further, the ratio of the length (L) to the inner diameter (D) of the chamber of the kneading machine, L/D is preferably from 4 to 50.

In the invention, the maximum shear rate in kneading may be so controlled as to fall from 100 to 100,000/sec, preferably from 200 to 5,000/sec.

The kneading temperature may fall generally within a range of from 50 to 300° C. For preventing oxidation of the resin (A), preferably, the hopper mouth is sealed up with nitrogen and the resin mixture is kneaded at a temperature falling within a range of from 165° C. to 220° C. Regarding the kneading time (this may be referred to as "residence time"), better results may be obtained in case where the time is longer; but from the viewpoint of oxidation prevention of the resin (A) and the production efficiency, the time may be generally from 10 seconds to 20 minutes, preferably from 20 seconds to 15 minutes, more preferably from 30 seconds to 10 minutes.

The oxygen-absorbing barrier film of the invention comprises a matrix of a resin (A) having an oxygen permeability of at most 100 cc/m²·day·atm (20 µm) and, dispersed in the matrix, a resin (B) having an oxygen absorption rate of at least 0.001 cc/cm²·day (20 µm), wherein the resin (B) is in the form of rods of such that the average maximum diameter of the cross section thereof perpendicular to the lengthwise direction is at most 1.0 µm.

In the oxygen-absorbing barrier film of the invention, the resin (B) must be, in the matrix of the resin (A), in the form of rods of such that the average maximum diameter of the cross section thereof perpendicular to the lengthwise direction is at most 1.0 µm.

The resin (B) is dispersed under the condition as above, and therefore the oxygen barrier properties and the adhesiveness to olefin films of the oxygen-absorbing barrier film of the invention are good.

The maximum diameter of the cross section of the resin (B) perpendicular to the lengthwise direction (hereinafter this may be simply referred to as "the maximum diameter of the cross section") is at most 1.0 µm on average, but preferably the proportion of those, of which the maximum diameter of the cross section is at most 1.0 µm, is at least 70%, more preferably at least 90% among the resin (B).

In the matrix of the resin (A), the ratio of the length in the lengthwise direction to the maximum diameter of the cross section (the length in the lengthwise direction/the maximum diameter of the cross section) of the resin (B) is preferably more than 5.

The oxygen-absorbing barrier film of the invention may be obtained from the oxygen-absorbing barrier resin composition of the invention.

Strictly, films and sheets may be differentiated by their thickness, but in the invention, the film has a concept that includes sheets also.

The thickness of the oxygen-absorbing barrier film of the invention is not particularly limited and may be generally within a range of from 1 to 300 µm, preferably from 3 to 50 µm. Having a thickness that falls within the above-defined range, the oxygen-absorbing barrier film of the invention has good oxygen barrier properties and is advantageous in point of the transparency, the flexibility, the softness, etc.

Preferably, the oxygen-absorbing barrier film of the invention has a three-layered structure of surface layer (1)/core layer/surface layer (2), in which the proportions of the thickness of respective layers to the overall thickness of the three layers are from 15 to 40% for the surface layer (1), from 20 to 70% for the core layer and from 15 to 40% for the surface layer (2).

Having the thickness ratio of the constitutive layers that falls within the above-defined range, the oxygen-absorbing barrier film of the invention has good oxygen barrier properties and has excellent adhesiveness to olefin films.

In order to realize the above structure of the oxygen-absorbing barrier film, the shaping conditions and others are suitably controlled in consideration of the constitution of the oxygen-absorbing barrier resin composition, the melt viscosity of the resin A and the resin B constituting it, the compatibility of the resin A and the resin B, etc.

In the Oxygen-Absorbing Barrier Film of the Invention, the ratio of the major diameter to the minor diameter in the cross section perpendicular to the lengthwise direction of the resin (B) dispersed in the matrix resin (A) is preferably such that in the surface layer (1) and the surface layer (2), the ratio is less than 2.0, and in the core layer it is at least 2.0. Those, which have a small ratio of the major diameter to the minor diameter of the cross section perpendicular to the lengthwise direction of the dispersed resin (B), have a nearly rod-shaped structure; while those, which have a large ratio, have a tabular structure or a structure of plural tabular structures bonding to each other.

When the resin (B) satisfies the condition, the oxygen-absorbing barrier film has good oxygen-barrier properties and has excellent adhesiveness to olefin films.

The oxygen-absorbing barrier film of the invention, when comprising, as the resin (A), an oxygen-barrier resin having an oxygen permeability of from 3 to 5 cc/m²·day·atm (20 µm) under a condition at 25° C. and a relative humidity of 65%, may have an oxygen permeability of at most 1 cc/m²·day·atm (20 µm). On the other hand, the oxygen-absorbing barrier film of the invention, when comprising, as the resin (A), an oxygen-barrier resin having an oxygen permeability of from 3 to 5 cc/m²·day·atm (20 µm) under a condition at 25° C. and a relative humidity of 90%, may have an oxygen permeability of at most 2 cc/m²·day·atm (20 µm).

The oxygen-absorbing barrier film of the invention may be obtained by shaping the oxygen-absorbing barrier resin composition of the invention. The shaping method is not specifically defined, for which is employable any conventional known thermal melt-shaping method.

The thermal melt-shaping method includes, for example, extrusion molding, inflation molding, blow molding or the like; and above all, especially preferred is extrusion molding. The obtained film may be directly folded into a bag-like shape and heat-sealed to give a bag-like container; or may be processed into a cup-like or tray-like container according to a vacuum forming method.

The resin composition may be melt-kneaded in an extruder, and then extruded out through a T-die, a circular die (ring die) or the like into a predetermined shape, thereby giving a T-die film, a blown film or the like. The T-die film may be biaxially stretched to be a biaxially stretched film.

As the extruder, herein usable is a kneading machine such as a single-screw extruder or a double-screw extruder.

In general, a T-die is fitted to a single-screw extruder, and a cooling roll and a film take-up device are connected thereto for use herein. The extrusion temperature is preferably from 165° C. to 220° C. The cooling roll is set at 30° C. to 60° C., and the take-up speed is kept constant and controlled by the feed rate into the extruder, whereby a film having a desired thickness may be obtained.

In the shaping process, the residence time of the resin composition in the heating and melting zone is preferably within 30 minutes, more preferably within 20 minutes. When the time is too long, then the dispersion morphology of the resin (B) may change in the melt state or the dispersed resin (B) may agglomerate together, thereby increasing the dispersion diameter thereof.

The oxygen-barrier multilayer structure of the invention has at least a layer comprising an oxygen-absorbing barrier film of the invention (this may be hereinafter referred to as "oxygen-absorbing barrier film layer").

In the oxygen-barrier multilayer structure of the invention, the oxygen-absorbing barrier film layer may contain any other known oxygen-absorbing component than the oxygen-absorbing gas-barrier resin composition of the invention, so far as the advantages of the invention are not detracted. The amount of the other oxygen-absorbing component than the oxygen-absorbing gas-barrier resin composition of the invention may be less than 50% by weight relative to the whole amount of the oxygen-absorbing components (the total amount of the oxygen-absorbing gas-barrier resin composition of the invention and the other oxygen-absorbing component than the oxygen-absorbing gas-barrier resin composition of the invention), preferably less than 40% by weight, more preferably less than 30% by weight.

The oxygen-absorbing barrier film layer of the oxygen-barrier multilayer structure of the invention absorbs the oxygen permeating through it from the outside, depending on the constitution of the multilayer structure, and, for example, when a packing material comprising the oxygen-barrier multilayer structure is formed into a bag-shaped packing container, this is to be a layer that functions to absorb the oxygen inside the packing material via the sealing material layer thereof.

The oxygen-barrier multilayer structure of the invention has at least one layer of a sealing material layer, a supporting substrate layer, a deodorant layer, a surface resin layer and a protective layer, in addition to the oxygen-absorbing barrier film layer. In general, an oxygen-barrier multilayer structure indispensably comprises an oxygen absorbent layer and a gas-barrier layer; but in the oxygen-barrier multilayer structure of the invention, the oxygen-absorbing barrier film layer has the functions of those layers, and therefore, it is unnecessary to additionally form the oxygen absorbent layer and the gas-barrier layer therein.

The constitution of the oxygen-barrier multilayer structure of the invention is not specifically defined; and it may be a film or may have any other constitution.

In the oxygen-barrier multilayer structure of the invention, the order of laminating these constitutive layers is not specifically defined. In general, it is sealing material layer/oxygen-absorbing barrier film layer/deodorant layer/surface resin layer/protective layer. Of those layers, the necessary layers may be provided, if desired.

The sealing material layer is a layer that has the function of melting under heat to adhere to each other (heat seal) to thereby form, inside a packing container, a space that is shielded from the outside of the packing container, and allows oxygen to permeate it so as to be absorbed by the oxygen-absorbing barrier film layer while preventing direct contact of the oxygen-absorbing barrier film layer with the packed subject inside the packing container.

Specific examples of the heat-sealable resin for use in forming the sealing material layer include α-olefin homopolymers; ethylene/α-olefin copolymers; copolymers of an α-olefin as a main component with vinyl acetate, acrylate, methacrylate or the like; acid-modified poly-α-olefin resins prepared by modifying an α-olefin (co)polymer with an unsaturated carboxylic acid; ionomer resins; their mixtures; etc.

The oxygen permeation rate at 25° C. of the sealing material layer is preferably at least 200 cc/m$^2$·atm·day (20 μm) irrespective of the number of the layers, the layer thickness and the constitutive material, more preferably at least 400 cc/m$^2$·atm·day (20 μm).

The permeation rate is expressed by the volume of the vapor that passes through a test piece having a unit area for a period of unit time in a unit partial pressure difference, and can be determined by the method of JIS K7126, "test method for gas permeation rate through plastic films and sheets".

The oxygen-barrier multilayer structure of the invention may have a deodorant layer containing a deodorizing component.

The deodorizing component for use herein may be a known one. The deodorizing component may be an adsorbent that traps a smelling component by its adsorbing action, or may also be a deodorant having a deodorizing effect that changes a smelling component into a non-smelling component by chemical reaction or the like. It may have both the adsorbing action and the deodorizing action.

The adsorbent may be an organic adsorbent such as soybean powder, polyester resin or acrylic resin, or an inorganic adsorbent such as natural zeolite, synthetic zeolite, silica gel, activated carbon, impregnated activated carbon, activated clay, activated aluminum oxide, clay, diatomaceous earth, kaolin, talc, bentonite, magnesium oxide, iron oxide, aluminum hydroxide, magnesium hydroxide, iron hydroxide, magnesium silicate, aluminum silicate, synthetic hydrotalcite, silicon dioxide, sepiolite or clay minerals such as mica. From the viewpoint of the heat resistance thereof, preferred is an inorganic adsorbent.

In the invention, the deodorant is preferably a basic compound. This may be because, in the invention, the oxygen-absorbing action of the cyclized product of a conjugated diene polymer, which is the active ingredient of the oxygen-absorbing gas-barrier film layer, goes on as such a cycle mechanism that the active hydrogen is first taken out from the cyclized product of a conjugated diene polymer to give a radical, then the radical traps an oxygen molecule to be a peroxy radical, and the peroxy radical takes out a hydrogen atom, and as a result, an acid component such as aldehyde or acid may be thereby generated.

The basic compound includes hydroxides of alkali metal or alkaline earth metal; other hydroxides such as iron hydroxide; carbonates and hydrogen carbonates of alkali metal or alkaline earth metal; ammonia; and organic basic compounds, such as amino group- or imino group-having compounds; amido group- or imido group-having compounds; urea bond-having compounds; etc.

In the oxygen-barrier multilayer structure of the invention, a surface resin layer may be provided outside the oxygen-absorbing barrier film layer.

The resin for use in forming the surface resin layer is preferably a heat-sealable resin that is capable of melting under heat to fuse with each other and extrudable.

For indication of contents therein, in the case where the oxygen-barrier multilayer tube is used as various containers, the resin is preferably printable by gravure printing, flexographic printing or the like.

Irrespective of the constitutive material thereof, the thickness of the surface resin layer preferably falls within a range of from 5 to 150 μm, more preferably from 10 to 100 μm. When the thickness of the surface resin layer falls within the above range, the structure may exhibit sufficient oxygen absorbability.

A protective layer may be formed outside the oxygen-absorbing barrier film layer for imparting heat resistance or the like.

The resin for use in the protective layer includes ethylene polymers such as high-density polyethylene; propylene polymers such as propylene homopolymer, propylene/ethylene random copolymer and propylene/ethylene block copolymer; polyamides such as nylon 6 and nylon 66; polyesters such as polyethylene terephthalate; etc. Of those, preferred are polyamides and polyesters.

The oxygen-barrier multilayer structure of the invention may have a supporting substrate layer, if desired. The material to constitute the supporting substrate layer may be selected from poly-α-olefin resins; polyester resins such as polyethylene terephthalate (PET); polyamide resins such as polyamide 6 and polyamide 6/polyamide 66 copolymer; natural fibers; synthetic fibers; sheets prepared by papermaking them.

In the oxygen-barrier multilayer structure of the invention, the position at which the supporting substrate layer is provided is not specifically defined.

An adhesive layer may be formed for adhering the constitutive layers. For the adhesive layer, usable is a film of a resin capable of melting under heat to fuse with each other. Specific examples of the resin of the type include, for example, α-olefin homopolymers or copolymers; acid-modified poly-α-olefin resins; ionomer resins; their mixtures; etc.

To those optional layers, including the protective layer, the sealing material layer, the deodorant layer, the surface resin layer, the supporting substrate layer and the adhesive layer, in the oxygen-absorbing multilayer structure of the invention, various additives may be added like in the gas-barrier material layer.

In the oxygen-barrier multilayer structure of the invention, the sealing material layer, the oxygen-absorbing barrier resin layer, the deodorant layer, the surface resin layer, the protective layer and other optional layers each may be a single layer or a multilayer; and in the multilayer, the constitutive layers may be the same or different.

The thickness of the oxygen-barrier multilayer structure of the invention may be suitably determined depending on the use thereof.

The production method for the oxygen-barrier multilayer structure of the invention is not specifically defined. Single-layered films for the individual layers to constitute the multilayer structure may be prepared and these may be laminated; or the multilayer structure may be directly formed.

The single-layered films may be obtained in the same manner as that for forming the oxygen-absorbing resin composition of the invention into films.

From the single-layered films obtained in the manner as above, a multilayer structure may be produced according to an extrusion coating method, a sandwich-lamination method or a dry lamination method.

For producing the multilayer structure, employable is a known coextrusion molding method; and for example, the extrusion molding is attained in the same manner as above except that the same number of extruders as that of the types of the resins are used and a multilayer multi-lamination die is used.

The coextrusion molding method includes a coextrusion lamination method, a coextrusion film molding method, a coextrusion inflation molding method, etc.

One example is shown. According to a water-cooling or air-cooling inflation method, the resins to constitute a gas-barrier material layer, an oxygen absorbent layer and a sealing material layer are separately heated and melted in different extruders, then extruded out through a multilayer cylindrical die at an extrusion temperature of, for example, from 190 to 210° C., and immediately quenched for solidification with a liquid coolant such as cooling water, thereby giving a tubular resin laminate.

In producing the multilayer structure, the temperature of the resins for the constitutive layers of the multilayer structure is preferably from 160 to 250° C. When it is lower than 160° C., the layer thickness may be uneven and the multilayer structure may be cut; but when higher than 250° C., the multilayer structure may also be cut. More preferably, the temperature is from 170 to 230° C.

The film take-up speed in producing the multilayer structure may be generally from 2 to 200 m/min, preferably from 50 to 100 m/min. When the take-up speed is lower than 2 m/min, then the production efficiency may be poor; but when it is higher than 200 m/min, then the multilayer structure could not be sufficiently cooled and may be fused during taking up.

In case where the multilayer structure comprises a stretchable material and its properties could be enhanced by stretching, as is in the case of a polyamide resin, a polyester resin, a polypropylene resin and the like, then the multilayer film obtained through coextrusion may be further uniaxially or biaxially stretched. If desired, it may be further heat-set.

The draw ratio in stretching is not particularly limited and may be generally from 1 to 5 times in both the machine direction (MD) and the transverse direction (TD), preferably from 2.5 to 4.5 times in both MD and TD.

The stretching may be attained in a known method of tenter stretching, inflation stretching, roll stretching or the like. The stretching may be attained in any order of MD stretching or TD stretching; however, it is preferably attained at the same time for MD and TD stretching. A tubular simultaneous biaxial stretching method may be employed.

The oxygen-barrier multilayer structure of the invention may be used, after shaped into various forms of packing containers.

Depending on their object and use, the packing containers may have various forms with the sealing material layer thereof facing inside. For example, they may be liquid packing containers having a shape such as a gable top, a brick type, a cube or a regular tetrahedron; other containers having a tray or cup form; containers having a pouch form; etc.

The method for forming the packing containers is not specifically defined. For example, an oxygen-absorbing multilayer structure is reheated at a temperature not higher than the melting point of the resins constituting it, and then uniaxially or biaxially stretched according to a thermoforming method of, for example, drawing, vacuum forming, pressure forming or press forming, or a roll stretching method, a pantographic stretching method, an inflation stretching method or the like, thereby giving a stretched article.

The packing containers obtained from the oxygen-absorbing multilayer structure of the invention may keep therein various commodities, for example, liquid foodstuffs such as typically liquid beverages, e.g., milks, juices, sake, whiskey, shochu, coffee, tea, jelly beverages or health drinks; seasonings, e.g., seasoning liquids, sauce, soy sauce, dressings, liquid stocks, mayonnaise, miso or grated spices; pasty foodstuffs, e.g., jam, cream, chocolate pastes, yogurt or jellies; processed liquid foodstuffs, e.g., liquid soups, boiled foods, pickles or stews; as well as high water-content foodstuffs such as typically raw noodles and boiled noodles of soba, udon, ramen or the like; uncooked rice such as cleaned rice, moisture-conditioned rice or pre-washed rice, and processed rice products such as cooked rice, boiled rice mixed with fish and vegetables, steamed rice with red beans, or rice porridge; powdery seasonings such as powdery soups or soup stocks; lunch boxes used in convenience stores; and also solid or liquid chemicals such as agricultural chemicals or pesticides; liquid or pasty drugs; cosmetics such as toilet lotions, facial creams, milky lotions, hair liquids or hair dyes; cleaning materials such as shampoos, soaps or detergents; electronic materials, recording media; etc. In the packing containers obtained from the oxygen-absorbing multilayer structure of the invention, oxygen inside the containers may be absorbed by the oxygen-absorbing layer, and therefore the commodities kept therein may be prevented from being oxidized and rotted and may have good quality for a long period of time.

EXAMPLES

The invention is described more concretely with reference to the following Preparation Examples and Examples. Unless otherwise specifically indicated, part and % in all Examples are by weight.

The properties of the samples were evaluated according to the following methods.

[Weight-Average Molecular Weight (Mw) of Cyclized Product of conjugated diene polymer]

This is determined as a molecular weight in terms of polystyrene by gel permeation chromatography.

[Unsaturated Bond Reduction Ratio of Cyclized Product of conjugated diene polymer]

This is determined by proton NMR analysis with reference to the methods described in the following references (i) and (ii).

(i) M. A. Golub and J. Heller, Can. J. Chem., Vol. 41, 937 (1963).
(ii) Y. Tanaka and H. Sato, J. Polym. Sci.: Poly. Chem. Ed., Vol. 17, 3027 (1979).

In the conjugated diene monomer unit segment in a conjugated diene polymer, when the overall proton peak area before cyclization is represented by SBT and the peak area of the protons directly bonding to the double bond before cyclization is by SBU, and the overall proton peak area after cyclization is represented by SAT and the peak area of the protons directly bonding to the double bond after cyclization is by SAU, then the peak area ratio (SB) of the protons directly bonding to the double bond before cyclization is:

$$SB=SBU/SBT,$$

and the peak area ratio (SA) of the protons directly bonding to the double bond after cyclization is:

$$SA=SAU/SAT.$$

Accordingly, the unsaturated bond reduction ratio is determined according to the following expression:

Unsaturated bond reduction ratio (%)=100×(SB−SA)/SB.

[Dispersion profile of resin (B) (mean maximum diameter of the cross section perpendicular to the lengthwise direction (this is referred to as "dispersion diameter" in the Examples), thickness ratio of surface layer (1)/core layer/surface layer (2))]

A sample piece having a width of 5 mm and a length of 10 mm is cut out of the oxygen-absorbing barrier film; and using Cryo Ultramicrotome, the sample piece is cut to expose its cross section at −80° C., and then this is subjected to osmium vapor dyeing for 30 minutes and to carbon vapor deposition to a thickness of about 20 nm. Using a field-emission scanning electron microscope (Hitachi's trade name, "S-4700") at an accelerating voltage of 5 kV, the reflected electron image of the cross section of the pretreated sample piece is analyzed with a YAG detector.

The dispersion profile in the oxygen-absorbing barrier resin composition is analyzed in the same manner as above, preparing and taking a strand having a length of 10 mm.

[Oxygen Permeability]

According to the differential pressure method of JIS K7126 and using a differential pressure gas/vapor permeability measuring device (differential pressure gas permeation device: GTR Tec's "GTR-30XAD2", detector: Yanaco Technical Science's "G2700T·F"), the sample is analyzed at a temperature of 25±2° C. and a relative humidity of 65% or 90%. The shape of the permeable face of the sample is a circle having a diameter of 4.4 cm, and the data are converted into those through a sample having a thickness of 20 μm. The unit of the data is cc/m$^2$·day·atm (20 μm).

[Oxygen Absorption Rate]

A resin film is cut into a size of 100 mm×100 mm, and put into an aluminum pouch having a size of 300 mm×400 mm (Sakura Bussan's trade name "Hiretort Alumi ALH-9"), then air inside it is completely removed, and 100 cc of air having an oxygen concentration of 20.7% is sealed up therein, stored at 25±2° C. for 5 days, and then the oxygen concentration inside the pouch is measured with an oxygen densitometer (US Ceramatic's trade name "Food Checker HS-750").

From the thus-measured oxygen concentration and the oxygen concentration, 20.7% before the start of the test, the oxygen absorption rate (cc/cm$^2$·day) (20 μm) is computed. Samples having a larger value measured in the manner are more excellent in the oxygen absorption rate.

[Peel Strength]

A film and an unstretched polypropylene film (MFR=6.9, Idemitsu Petrochemical's trade name "F-734NP") are laminated, using a hot roll laminator (EXCELAM II355Q, by Gmp Co., Ltd.) set at 160° C. The obtained laminate film (multilayer structure) is cut into strips of 15 mm width×150 mm, and the 180-degree peel strength between the propylene film and the test film is measured at a speed of 200 mm/min, using a tensile tester (Tensilon UCT-5T, by Orientec).

Reference Example 1

300 parts of polyisoprene (cis-1,4 unit, 73%; trans-1,4 unit, 22%; 3,4-unit, 5%; weight-average molecular weight, 154,000) cut into 10 mm square pieces were put into a pressure reactor equipped with a stirrer, a thermometer, a reflux condenser and a nitrogen gas inlet tube, along with 700 parts of cyclohexane thereinto. The reactor was purged with nitrogen, then heated at 75° C., and with stirring, polyisoprene was completely dissolved in cyclohexane, and thereafter 2.19 parts of p-toluenesulfonic acid (this was dehydrated by reflux in toluene to have a water content of at most 150 ppm) was put into it to attain cyclization at a temperature not higher than 80° C. After thus reacted for 7 hours, aqueous 25% sodium carbonate solution containing 0.84 parts of sodium carbonate was put into it to stop the reaction. Then at 80° C., water was removed by azeotropic refluxing dehydration, and thereafter the catalyst residue was removed from the system through a glass fiber filter having a pore diameter of 2 μm, thereby giving a solution of a cyclized product (B1) of the conjugated diene polymer. A part of the solution was sampled, the solvent was evaporated away from it, and this was further dried in vacuum to give a solid cyclized product (B1) of the conjugated diene polymer. Its weight-average molecular weight was 141,000, and its unsaturated bond reduction ratio was 48.9%. The cyclized product (B1) of the conjugated diene polymer was shaped to give a film having a thickness of 20 µm. The oxygen absorption rate of the film of the cyclized product (B1) of the conjugated diene polymer was 0.03 cc/m²·day (20 µm).

Example 1

Oxygen-Absorbing Barrier Resin Composition

To the above solution containing 500 parts of the cyclized product (B1) of the conjugated diene polymer, added were an antioxidant, pentaerythrityl tetrakis[3-(3,5-di-t-butyl-4-hydroxyphenyl)propionate] (Ciba Specialty Chemicals' trade name "Irganox 1010") in an amount of 100 ppm relative to the cyclized product (B1) of the conjugate diene polymer, and 500 parts of low-density polyethylene (MFR=4.0, Idemitsu Petrochemical's trade name "Moretec 0438") (P1), and then a part of the solvent was evaporated away followed by vacuum drying to give a solid blend of cyclized product (B1) of conjugated diene polymer/low-density polyethylene (P1) (blend ratio=50/50).

Using a single-screw extruder (40 mmφ, L/D=25; Ikegai's trade name "SS-40-25"), the above blend after ground was kneaded at 180° C. and at a screw revolution speed of 35 rpm. The kneaded mixture was extruded out as strands through the 3 mmφ die at the tip of the extruder, and the strands were cut to give pellets of the resin (B) blend. The pellets were press-formed to give a film having a thickness of 20 µm. The oxygen absorption rate of the film was 0.017 cc/cm²·day (20 µm).

40 parts of the pellets of the resin (B) blend and 60 parts of pellets of an ethylene/vinyl alcohol copolymer (EVOH) (oxygen permeability, 3.4 cc/m²·day·atm (20 µm); ethylene content, 44 mol %; Kuraray's trade name "E105B") (A1) were dry-blended. The resulting blend was kneaded, using a double-screw unidirectional rotation kneading extruder (43 mmφ, L/D=33.5; Berstorf's ZE40A), at 200° C. and at a screw revolution speed of 150 rpm. The kneaded mixture was extruded out as strands through the 3 mmφ die at the tip of the extruder, and the strands were cut to give pellets of an oxygen-absorbing barrier resin composition (1). During the kneading, the maximum shear rate was 2500/sec; and the residence time of the resin composition in the extruder was about 90 seconds.

A part of the strands were cut into a size of 10 mm, and the dispersion profile of the resin (B) blend therein was analyzed. As a result, the resin (B) blend formed a rod-like structure of which the ratio of the length in the lengthwise direction to the maximum diameter of the cross section was more than 5, and the mean dispersion diameter of the cross section thereof was 0.2 µm.

Example 2

Oxygen-Absorbing Barrier Film

A T-die (die width: 150 mm, die thickness: 0.3 mm), a cooling roll and a film take-up unit (all by Toyo Seiki Seisakusho) were connected to a laboratory plastomill single-screw extruder (20 mmφ, L/D=20); and the oxygen-absorbing barrier resin composition pellets (1) prepared in Example 1 were extruded and shaped into an oxygen-absorbing barrier film (f1) having a width of 100 mm and a thickness of 20 µm. The barrel temperature of the extruder was 185° C.; the T-die temperature was 185° C.; the cooling roll temperature was 50° C.; the take-up speed was 200 cm/min; and the number of revolution was 23 rpm. The residence time of the resin composition in the single-screw extruder was about 5 minutes.

[Structure of Oxygen-Absorbing Barrier Film]

Figure 2:
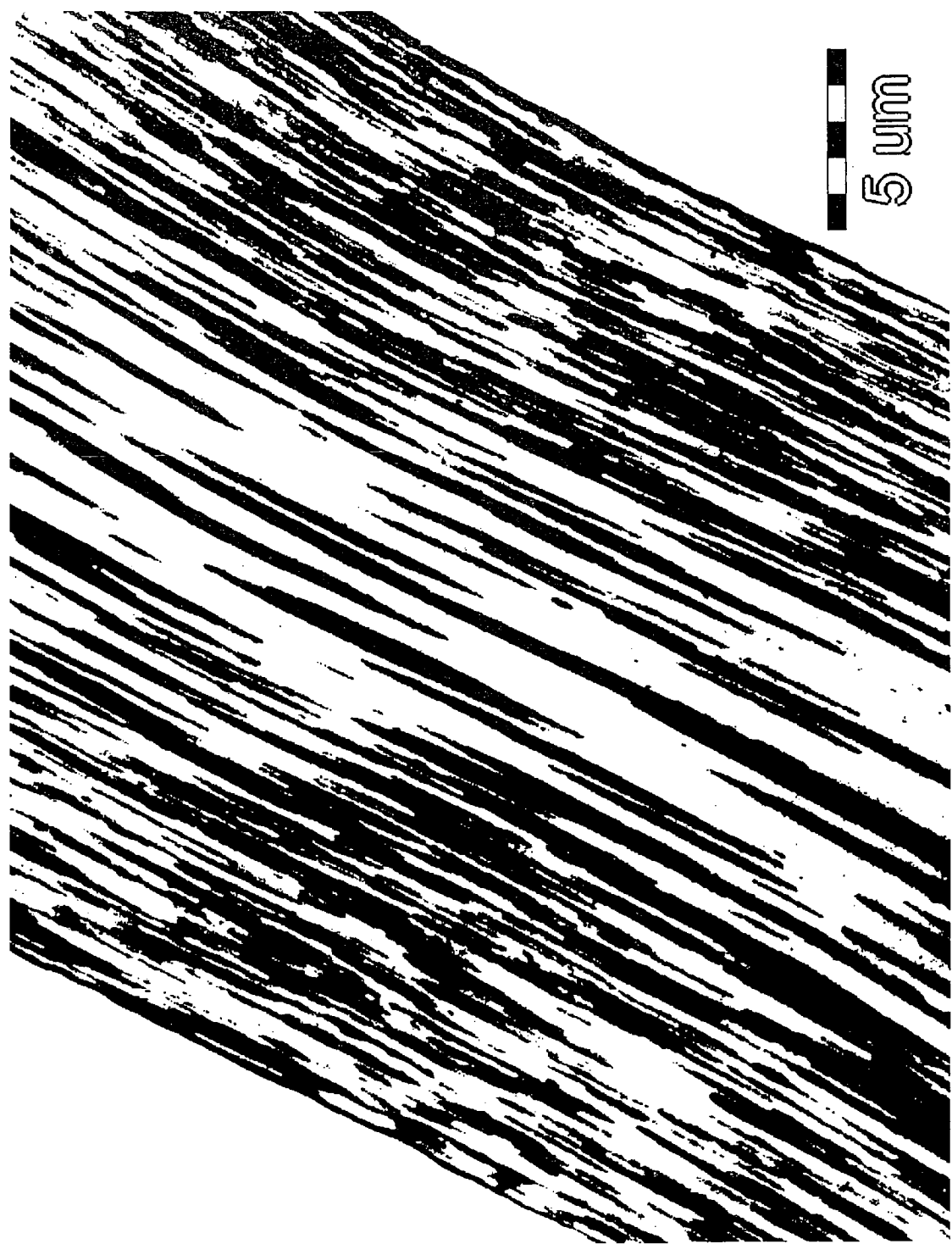
FIG. 2 This is an electromicroscopic photograph of an MD-cross section of an oxygen-absorbing barrier film of the invention, showing the dispersion condition of a resin (B) blend in the film. In the figure, the length of the line segment is 5 μm.

The results of the electromicroscopic observation of the obtained oxygen-absorbing barrier film (f1) are in FIG. 1 (TD-cross section) and FIG. 2 (MD-cross section).

FIG. 1 shows a cross section of the rod-shaped resin (B) (blend of the cyclized product (B1) of the conjugated diene polymer and the low-density polyethylene (P1)) (hereinafter this may be simply referred to as "resin (B) blend") perpendicular to the lengthwise direction thereof; and FIG. 2 shows a cross section of the rod-shaped resin (B) blend in the lengthwise direction thereof.

Table 1 shows a mean dispersion diameter of the cross section of the resin (B) blend in the oxygen-absorbing barrier film (f1).

FIG. 1 and FIG. 2 confirm the formation of a sea-island structure of the rod-shaped island segment (rod-shaped structure) of the resin (B) blend existing in the sea area of the ethylene/vinyl alcohol copolymer resin (A1).

FIG. 1 and FIG. 2 further confirm the formation of a three-layered structure of surface layer (1)/core layer/surface layer (2) as aligned in that order from the left upper side toward the right lower side on the figure (the surface layers differ from the core layer in the density of the rod-shaped structure).

As in FIG. 1, it is known the maximum diameter of the cross section of the resin (B) blend in the lengthwise direction thereof is at most 1.0 µm on average, and that the ratio of the major diameter to the minor diameter of the cross section perpendicular to the lengthwise direction of the resin (B) is less than 2.0 in the surface layer (1) and the surface layer (2), and is at least 2.0 in the core layer.

Further as in FIG. 1 and FIG. 2, it is known that the ratio of the length in the lengthwise direction to the maximum diameter of the cross section (the length in the lengthwise direction/the maximum diameter of the cross section) of the rod-shaped resin (B) is more than 5.

Figure 3:
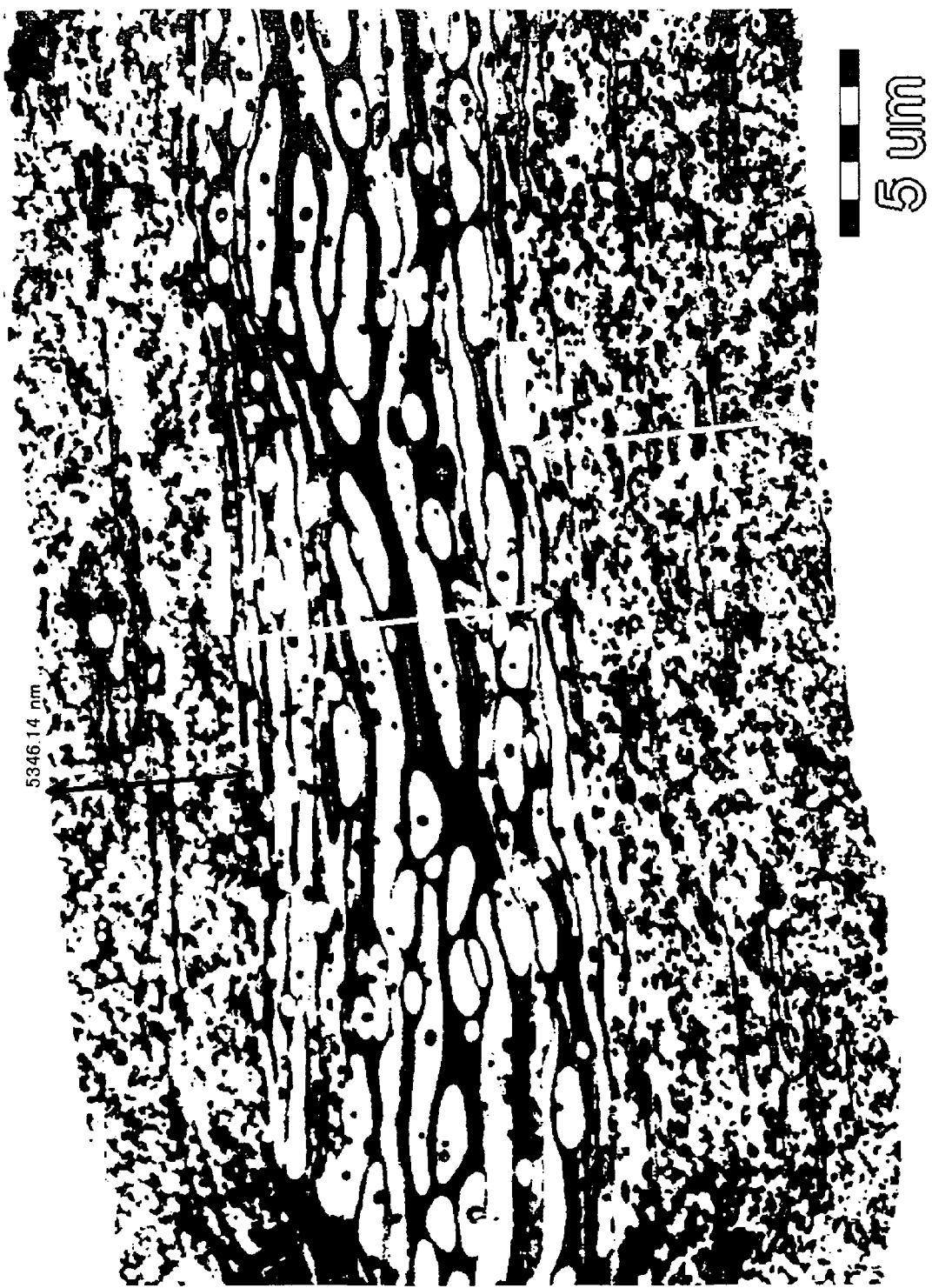
FIG. 3 This is an electromicroscopic photograph of a TD-cross section of an oxygen-absorbing barrier film of the invention, showing the three-layered structure of the film. In the figure, the length of the line segment is 5 μm.

FIG. 3 indicates that the sea/island dispersion structure of the ethylene/vinyl alcohol copolymer (A1) and the resin (B) blend is a two-type three-layered structure of surface layer (1)/core layer/surface layer (2) in that order from the top to the bottom of the figure, in which the thickness of each layer shown by the arrow is 5.3 µm, 8.3 µm and 7.5 µm, respectively. The ratio of the thickness of each layers calculated from these thickness is 25/39/36.

[Oxygen Permeability of Oxygen-Absorbing Barrier Film]

The oxygen-absorbing barrier film (f1) obtained in Example 2 was analyzed for the oxygen permeability thereof. The result is shown in Table 1.

Example 3

Peel Strength of Laminate Film

A laminate film (oxygen-barrier multilayer structure) (F1) produced from the oxygen-absorbing barrier film (f1) and the unstretched polypropylene film was analyzed for the peel strength. The result is shown in Table 1.

TABLE 1

|  | Example | | Comparative Example | |
|---|---|---|---|---|
|  | 1 | 4 | 1 | 4 |
| Oxygen-absorbing barrier resin composition | (1) | (2) | (C1) | (C2) |
| Resin (A) | | | | |
| Ethylene/vinyl alcohol copolymer (EVOH) E105B (A1) *1 | 60 | — | 100 | — |
| Ethylene/vinyl alcohol copolymer (EVOH) H171B (A2) *2 | — | 70 | — | — |

TABLE 1-continued

| | | | | |
|---|---|---|---|---|
| Ethylene/vinyl alcohol copolymer (EVOH) A4412 (A3) *3 | — | — | — | 100 |
| Resin (B) blend | | | | |
| Cyclized product of conjugated diene polymer (B1)/polyethylene (P1) *4 | 40 | 30 | — | — |
| Mean dispersion diameter of cross section of resin (B) blend (μm) | 0.2 | 0.2 | — | — |
| Ratio of resin (A)/resin (B1) | 75/25 | 83/17 | — | — |

| | Example | | Comparative Example | |
|---|---|---|---|---|
| | 2 | 5 | 2 | 5 |
| Oxygen-absorbing barrier film | f1 | f2 | fc1 | fc2 |
| Mean dispersion diameter of cross section of resin (B) blend (μm) | 0.4 | 0.4 | — | — |
| Ratio (%) of surface layer (1)/ core layer/surface layer (2) | | | | |
| Surface layer (1) | 25 | 33 | — | — |
| Core layer | 39 | 35 | — | — |
| Surface layer (2) | 36 | 32 | — | — |
| Oxygen permeability 1 (25° C., 65% RH) *5 | 0.21 | 0.14 | 3.4 | 2.3 |
| Oxygen permeability 2 (25° C., 90% RH) *5 | 0.25 | 0.18 | 13.1 | 11.9 |

| | Example | | Comparative Example | |
|---|---|---|---|---|
| | 3 | 6 | 3 | 6 |
| Laminate film | F1 | F2 | FC1 | FC2 |
| Peel strength (N/15 mm) | 0.9 | 0.5 | 0.1> | 0.1> |

*1: A1 oxygen permeability = 3.4 cc/m$^2$ · day · atm (20 μm).
*2: A2 oxygen permeability = 1.4 cc/m$^2$ · day · atm (20 μm).
*3: A3 oxygen permeability = 2.3 cc/m$^2$ · day · atm (20 μm).
*4: B1 oxygen absorption rate = 0.3 cc/cm$^2$ · day (20 μm).
B1/P1 blend ratio = 50/50.
*5: unit, cc/m$^2$ · day · atm (20 μm).

Examples 4 to 6

Oxygen-absorbing barrier resin composition pellets (2) were obtained in the same manner as in Example 1, for which, however, the ingredients of the composition were changed as in Table 1 (the ethylene/vinyl alcohol copolymer (EVOH) was Kuraray's trade name "H171B" (A2) having an oxygen permeability of 1.4 cc/m$^2$·day·atm (20 μm) and having an ethylene content of 38 mol %) (Example 4). A part of the strand prepared by extrusion through a 3 mmφ die at the tip of the extruder was cut to have a length of 10 mm, and the dispersion profile of the resin (B) blend therein was analyzed. As a result, the resin (B) blend formed a rod-like structure of which the ratio of the length in the lengthwise direction to the maximum diameter of the cross section was more than 5, and the mean dispersion diameter of the cross section thereof was 0.2 μm.

In the same manner as in Example 2, an oxygen-absorbing barrier film (f2) was obtained from the oxygen-absorbing barrier resin composition pellets (2). Its properties are shown in Table 1. The oxygen permeability of the obtained oxygen-absorbing barrier film (f2) was determined (Example 5). A laminate film (F2) obtained in the same manner as in Example 3 but using the oxygen-absorbing barrier film (f2) was analyzed for the peel strength (Example 6).

The results are shown in Table 1.

Comparative Examples 1 to 3

The ethylene/vinyl alcohol copolymer (EVOH) (Kuraray's trade name E105B having an oxygen permeability of 3.4 cc/m$^2$·day·atm (20 μm) and an ethylene content 44 mol %) (A1) was used alone. This is an oxygen-absorbing barrier resin (C1) (Comparative Example 1). Its properties are shown in Table 1.

Using this and in the same manner as in Example 2, an oxygen-absorbing barrier film (fc1) was obtained. Its properties are shown in Table 1. The oxygen permeability of the obtained oxygen-absorbing barrier film (fc1) was determined (Comparative Example 2). The peel strength of the laminate film (FC1) obtained in the same manner as in Example 3 was determined (Comparative Example 3).

These results are shown in Table 1.

Comparative Examples 4 to 6

The same experiments as in Comparative Examples 1 to 3 were carried out, in which, however, an ethylene/vinyl alcohol copolymer (EVOH) (Nippon Synthetic Chemical's trade name "A4412" having an oxygen permeability of 2.3 cc/m$^2$·day·atm (20 μm) and an ethylene content of 44 mol %) (A3) was used. The results are shown in Table 1.

The results in Table 1 confirm the following:

According to the invention, there is obtained an oxygen-absorbing barrier resin composition that comprises a matrix of a resin (A) having an oxygen permeability of at most 100 cc/m$^2$·day·atm (20 μm) and, dispersed in the matrix, a resin (B) having an oxygen absorption rate of at least 0.001 cc/cm$^2$·day (20 μm), wherein the resin (B) is in the form of rods of such that the average maximum diameter of the cross section thereof perpendicular to the lengthwise direction is at most 1.0 μm.

The oxygen-absorbing barrier film obtained from the oxygen-absorbing barrier resin composition and having the same structural profile has a three-layered structure of surface layer (1)/core layer/surface layer (2), in which the proportions of the constitutive layers to the overall thickness of the three layers are from 15 to 40% for the surface layer (1), from 20 to 70% for the core layer and from 15 to 40% for the surface layer (2).

The oxygen-absorbing barrier film has an extremely low oxygen permeability not only under low-humidity conditions but also under high-humidity conditions, and the multilayer film comprising it has an excellent peel strength.

As opposed to these, the film of an ethylene/vinyl alcohol copolymer alone has a large oxygen permeability even under low-humidity conditions, and especially under high-humidity condition, it has an extremely large oxygen permeability; and the peel strength of the multilayer film comprising it is extremely low.

The invention claimed is:

1. An oxygen-absorbing barrier film comprising a resin (A) being an ethylene/vinyl alcohol copolymer and having an oxygen permeability of at most 100 cc/m$^2$·day·atm (20 μm) and a resin (B) comprising a cyclized product of a conjugated diene polymer and having an oxygen absorption rate of at least 0.001 cc/cm$^2$·day (20 μm), wherein the resin (B) is dispersed in a matrix of the resin (A) and the resin (B) is in the form of rods of such that an average maximum diameter of a cross section thereof perpendicular to a lengthwise direction is at most 1.0 μm, wherein the oxygen-absorbing barrier film has a three-layered structure of surface layer (1)/core layer/ surface layer (2), wherein proportions of a thickness of respective layers to an overall thickness of the three layers are from 15 to 40% for the surface layer (1), from 20 to 70% for the core layer and from 15 to 40% for the surface layer (2), and wherein a ratio of a major diameter to a minor diameter in the cross section perpendicular to the lengthwise direction of the resin (B) is less than 2.0 in the surface layer (1) and the surface layer (2), and is at least 2.0 in the core layer.

2. The oxygen-absorbing barrier film as claimed in claim 1, which is obtained by shaping said resin.

3. The oxygen-absorbing barrier film as claimed in claim 1, wherein the proportion of those of the resin (B) of which the maximum diameter of the cross section perpendicular to the lengthwise direction is at most 1.0 μm, is at least 70%.

4. The oxygen-absorbing barrier film as claimed in claim 1, wherein the ratio of the length in the lengthwise direction to the maximum diameter of the cross section (the length in the lengthwise direction/the maximum diameter of the cross section) of the resin (B) in the matrix of the resin (A) is more than 5.

5. An oxygen-barrier multilayer structure having at least a layer comprising the oxygen-absorbing barrier film of claim 1.

6. A packing container comprising the oxygen-barrier multilayer structure of claim 5.

* * * * *